United States Patent Office

Re. 27,630
Reissued May 1, 1973

27,630

ABATEMENT OF ACTIVE SOIL SLIDES

Edward D. Graf, 1680 Bryant St., Daly City, Calif. 94015, and Jason G. Kuhn, 2913 E. Desert Cove, Phoenix, Ariz. 85028

No Drawing. Original No. 3,503,215, dated Mar. 31, 1970, Ser. No. 729,387, May 15, 1968. Application for reissue Feb. 8, 1971, Ser. No. 110,348
Int. Cl. E02d *3/12, 3/14*
U.S. Cl. 61—35 7 Claims

Matter enclosed in heavy brackets [ ] appears in the original patent but forms no part of this reissue specification; matter printed in italics indicates the additions made by reissue.

ABSTRACT OF THE DISCLOSURE

Treatment of an active soil slide by directly contacting at least a portion of the slip surface with an aqueous solution of a soil stabilizing agent selected from lime, *and a water soluble ionized chemical containing soil strengthening cations of the type that stabilize the lattice of the soil particles by mechanisms including ion exchange with exchangeable cations naturally occurring in the soil particle lattice* [trivalent metal cations, a low molecular weight amine having up to about 8 carbon atoms, calcium orthophosphate, ammonium phosphate, and calcium chloride].

This invention relates to the stabilization of soil. More particularly it relates to the use of an aqueous solution or slurry of a soil stabilizing chemical which is applied directly to the slip surface of moving soil to stop an active slide.

Co-pending patent application Ser. No. 663,214 filed Aug. 25, 1967, for "Stabilization of Soil by Diffusion of Cations," *now Patent 3,490,241*, teaches the use of certain aqueous solutions containing soil stabilizing cations which exchange with the naturally occurring cations in clay type soils to stabilize the soil. The invention covered by said co-pending application is based upon the discovery that the stabilizing cations employed diffuse on their own and migrate through the soil to stabilize soil spaced from the region to which the aqueous solution of soil stabilizing cations is actually applied.

The present invention employs the same solutions described in said co-pending patent application and also may employ lime. It has now been discovered that these same cationic solutions or a lime solution can be directly applied to clay type soil to completely and quickly stop a slide that is active or moving. The selected aqueous solution of soil stabilizing chemical is applied to at least a portion of the slip plane or slip surface involved in the slide. The slip surface of a slide area is beneath the soil surface and may be some substantial distance down. It has been found that by simply pouring the selected aqueous solution with the stabilizing chemicals through naturally occurring tension cracks and fissures, the solution will flow by gravity to the slip surface and perform the stabilizing function and abate the slide. *Concurrent with this mass flow distribution, physical diffusion of the aqueous solution will occur.* The term "slip surface" or "slip plane" is used to indicate the region of that soil where one zone of soil moves relative to its surrounding soil. It represents an interface between a fixed mass and a moving mass of soil. The soil stabilizing solution is applied to the interface area to strengthen or otherwise prevent relative movement along the interface.

As noted, the chemical stabilizers employed in the present method are aqueous solutions or slurries. In some cases the useful materials may require the addition of a solubilizing substance to bring about the water solubility. For example, many of the materials may require an acid in solution to create the desired solubility. *Any ionizable water soluble material which yields cations that will diffuse through the soil and exchange with naturally occurring cations in the soil to improve soil stability can be utilized herein.* Preferred materials for use in the present invention include lime, trivalent metal cations such as the ferric and aluminum cations, calcium orthophosphate, ammonium phosphate, calcium chloride and the like. In order to solubilize some of these materials such as calcium orthophosphate, the addition of an acid such as phosphoric acid may be needed. The trivalent metal cations are conveniently utilized as a metal salt such as ferric chloride, aluminum chloride or aluminum nitrate.

Another class of stabilizing chemicals for present purposes is formed from an aqueous solution of a low molecular weight amine containing up to about 8 carbon atoms. These materials are solubilized as acid salts with for example strong mineral acids such as hydrochloric acids. Typical low molecular weight amines include ethylamine, propylamine, methylbutylamine, trimethylamine, octylamine, methylisopropylamine, and the like.

Without intending to limit the invention by any theory advanced herein, it is believed that the stabilization occurs through an ion exchange mechanism in the case of the chemicals which are ionized and provide cations in solution. In the case of the lime, it is believed that the stabilizing mechanism is more analogous to a cementitious type of strengthening of the soil.

After the slide is initially abated by the present treatment, it is contemplated that additional stabilizing techniques may thereafter be employed.

The invention is primarily adapted for use on clay type soils or those which become clay-like in physical or chemical properties under the conditions which exist during the slide. It will be appreciated that clay is a generic term covering many different types of materials. Each type of clay may respond better to some soil stabilizing chemicals than others. To this end it is preferred to initially take small samples of the slide soil and treat them with a plurality of the chemicals of the type herein described. In this way the optimum chemical can be used in the actual treatment of the slide. Sometimes more than one of the chemical solutions may be applied and advantages obtained in stabilizing the area.

In carrying out the process it is not necessary to completely cover the entire surface area of the slip plane or slip surface. The desired stabilization can frequently be accomplished by contacting only a portion of the slip surface. This will depend upon the nature of the soil structure and the extent of the slide problem. Gentle slopes and areas without much weight on them may require less areas of contact and less volume of solution at the contact areas.

The amount of chemical applied will be at least that which is sufficient to effectively stop the slide being treated. In general an attempt is made in the case of ionizable chemicals to saturate or satisfy at least a substantial portion of the exchange capacity of the particular clay being treated at those areas of the slip surface that are contacted.

In making up the aqueous solutions, considerable variation in concentration can be tolerated. Essentially, an aqueous flowable solution is desired that can penetrate through small cracks and fissures to reach the slip plane. As will be seen, a concentration of 1 lb. of chemical in a gallon of solution is one convenient workable concentration.

The following examples will illustrate the results which can be achieved:

EXAMPLE I

San Francisquite Creek Slide
Menlo Park, Calif.

At this location a filled area forming the down-side slope along 250 feet of highway terminating with a creek at the bottom of a slope began moving at an accelerated pace. In the 24 hour period prior to treatment the soil slope had moved 1½". The slope surface of the soil was approximately 70 feet long and sloped one foot vertically for every 1½ feet horizontally. In treating the condition, 75 gallons of an aqueous solution of aluminum chloride in a concentration of 1 pound per gallon was poured into cracks at the top of the slope. The movement of the slope was found to have completely abated after the treatment.

EXAMPLE II

Tybalt Tank Slide
San Jose, Calif.

At this location, a 34 foot diameter steel water tank was situated on a cut 20 feet from the edge of a down slope which had been filled. The slope dropped 1 foot vertically for every 1½ feet horizontally for the slope length of 30 feet. The slope was 60 feet wide at the top and 100 feet wide at the bottom. A two-story residence was situated 3 feet from the bottom of the slope. The slope began moving at a rate of about 1" per day and was accelerating. Hairline cracks at the top of the slope appeared with openings up to about ¾" wide. 28 gallons of an aqueous solution of aluminum chloride in a concentration of 1 pound per gallon were poured into the cracks at the top of the slope. The movement of the slope was completely abated.

Although the foregoing invention has been described in some detail by way of illustration and example for purposes of clarity of understanding, it is understood that certain changes and modifications may be practiced without the spirit of the invention as limited only by the scope of the appended claims.

What is claimed is:

1. A method for treating an active soil slide of a clay type soil to abate the slide comprising: directly contacting and retaining the existing soil structure of at least a portion of the soil forming the established slip plane or slip surface of said active soil slide with at least one aqueous solution containing a stabilizing agent selected from the group consisting of lime, *and a water soluble ionized chemical containing soil strengthening cations of the type that stabilizes the lattice of the soil particles by mechanisms including ion exchange with exchangeable cations naturally occurring in the soil particle lattice* [trivalent metal cations a low molecular weight amine having up to about 8 carbon atoms, calcium orthophosphate, ammonium phosphate, and calcium chloride] in an amount sufficient to substantially halt sliding along said slip surface[.], *the distribution of said solution including mass flow along the slip plane of the soil slide* .

2. The method in accordance with claim 1 wherein said direct contact is obtained by flowing said aqueous solution of stabilizing agent at ambient pressure through tension cracks and fissures in the soil to communicate with the soil at said slip surface.

3. A method in accordance with claim 1 wherein [the stabilizing agent in said aqueous solution provides cations for exchange with cations in said soil and] said aqueous solution is contacted with the soil at the slip surface in an amount to satisfy at least a substantial portion of the exchange capacity of the clay at the areas treated of said slip surface.

4. A method for treating clay type soil against sliding comprising: flowing an effective amount of an aqueous solution of a stabilizing agent selected from the group consisting of lime, trivalent metal cations, a low molecular weight amine having up to about 8 carbon atoms, calcium orthophosphate, ammonium phosphate, and calcium chloride through natural channels in the soil such as fissures and cracks to an area in the soil defining an existing slip surface and subject to movement relative to its surrounding soil, whereby an active or potentially active slide is abated.

5. A method in accordance with claim 4 wherein said aqueous solution is poured into said natural channels at a relatively high point on the soil surface so that the solution flows by gravity to the soil area subject to said movement relative to its surrounding soil.

6. A method in accordance with claim 4 wherein said aqueous solution contains aluminum trichloride in a concentration of about one pound per gallon.

*7. A method in accordance with claim 1 wherein said water soluble ionized chemical is selected from the group consisting of trivalent metal cations, a low molecular weight amine having up to 8 carbon atoms, calcium orthophosphate, ammonium phosphate, and calcium chloride.*

References Cited

The following references, cited by the Examiner, are of record in the patented file of this patent or the original patent.

UNITED STATES PATENTS

| | | | |
|---|---|---|---|
| 3,490,241 | 1/1970 | Kuhn | 61—36 R |
| 2,898,706 | 8/1959 | Lyons | 61—36 R X |
| 2,899,329 | 8/1959 | Lyons | 61—36 R X |
| 2,899,330 | 8/1959 | Lyons | 61—36 R X |
| 3,021,298 | 2/1962 | Rakowitz | 61—36 R X |
| 3,075,851 | 1/1963 | Hemwall | 61—36 R X |
| 3,077,740 | 2/1963 | Hemwall | 61—36 R |
| 3,243,962 | 4/1966 | Ratliff | 61—36 R |

STEPHEN J. NOVOSAD, Primary Examiner